US011619558B2

(12) United States Patent
Melnychuk

(10) Patent No.: US 11,619,558 B2
(45) Date of Patent: Apr. 4, 2023

(54) VIBRATING WIRE PIEZOMETER WITH MODIFIED WIRING

(71) Applicant: Precise Downhole Services Ltd., Nisku (CA)

(72) Inventor: Michael Melnychuk, Edmonton (CA)

( * ) Notice: Subject to any disclaimer, the term of this patent is extended or adjusted under 35 U.S.C. 154(b) by 55 days.

(21) Appl. No.: 17/402,296

(22) Filed: Aug. 13, 2021

(65) Prior Publication Data

US 2022/0074802 A1 Mar. 10, 2022

Related U.S. Application Data

(60) Provisional application No. 63/074,693, filed on Sep. 4, 2020.

(30) Foreign Application Priority Data

Jan. 12, 2021 (CA) ................................ CA 3105697

(51) Int. Cl.
*G01L 9/00* (2006.01)

(52) U.S. Cl.
CPC .................................... *G01L 9/008* (2013.01)

(58) Field of Classification Search
None
See application file for complete search history.

(56) References Cited

U.S. PATENT DOCUMENTS 4,029,979 A * 6/1977 Chapin .................... G01D 5/42 137/83
8,850,893 B2 * 10/2014 Seppa ................ G01R 33/0286 73/579
9,140,619 B2 * 9/2015 Wu ........................ G01L 9/0022

FOREIGN PATENT DOCUMENTS

GB 2180691 A * 4/1987 ............. G01D 5/243

* cited by examiner

*Primary Examiner* — Peter J Macchiarolo
*Assistant Examiner* — Jermaine L Jenkins
(74) *Attorney, Agent, or Firm* — Bennett Jones LLP

(57) ABSTRACT

A vibrating wire piezometer pressure sensor system has (a) a vibrating wire connected to a pressure diaphragm; (b) a first electromagnetic coil (EMC) associated with the vibrating wire; (c) a second EMC associated with the vibrating wire; wherein the first EMC and the second EMC are wired in series and in parallel to a signal processor for converting an electrical signal to a pressure measurement.

4 Claims, 2 Drawing Sheets

NEW WIRING - PARALLEL
Wires continue out of sensor & connect to cable
(3 wires total or 1.5 wires per coil)

VIBRATING WIRE PIEZOMETER WITH MODIFIED WIRING

CROSS REFERENCE TO RELATED APPLICATION

This application claims the priority benefit of U.S. Provisional Patent Application No. 63/071,693, filed on Aug. 28, 2021, and Canadian Application No. 3,105,697, filed on Jan. 12, 2021, the entire contents of both which are incorporated herein by reference.

FIELD OF THE INVENTION

The present invention relates to a pressure sensor comprising a vibrating wire piezometer with modified wiring.

BACKGROUND OF THE INVENTION

A vibrating wire piezometer uses an electronic oscillator circuit which causes a wire to vibrate at its natural frequency when under tension. The vibrating wire is attached at one end to a diaphragm. As the pressure on the diaphragm changes, so does the tension on the wire, which affects the frequency that the wire vibrates or resonates at. These frequency changes are a direct consequence of pressure changes and as such may be used to measure pressure.

The frequency can be sensed as digital pulses from an electromagnetic sensing coil. An electronic transmitter would then convert this into an electrical signal suitable for transmission.

These sensors require two electromagnetic coils (EMC) which interact with the vibrating wire. When a voltage is applied to the first EMC, it plucks the vibrating wire. The second EMC then senses the frequency of vibration. These EMCs are typically comprised of very thin (40 AWG) wire that is wrapped around a bobbin. As a result, they do not have much strength and it is very difficult to solder these wires.

There is a need in the art for a robust vibrating wire piezometer for a pressure sensor.

SUMMARY OF THE INVENTION

Conventional sensors comprise two EMCs wired in series. The present invention uses two EMCs wired in series and in parallel. The benefit of adding the extra wire and wiring the EMCs in parallel, is that if one EMC or connection fails, the other is still connected and a pressure sensor reading may still be obtained.

Therefore, in one aspect, the invention comprises a vibrating wire piezometer pressure sensor system, comprising:

(a) a vibrating wire connected to a pressure diaphragm;

(b) a first EMC and a second EMC associated with the vibrating wire;

(d) wherein a first electrical conductor is attached to the first EMC, a second electrical conductor attaches the first EMC to the second EMC, a third electrical conductor is attached to the second EMC, and a fourth electrical conductor is attached to the second electrical conductor;

(e) a signal processor for converting an electrical signal to a pressure measurement, wherein the signal processor is operably connected to the first, third and fourth electrical conductors.

In another aspect, the invention may comprise a method of operating a vibrating wire piezometer pressure sensor system comprising first and second EMCs, wired in series and in parallel to a signal processor for converting an electrical signal to a pressure measurement, the method comprising the step of switching from a series wiring configuration, to a parallel wiring configuration and using the signal processor to receive an electrical signal from only one of the two EMCs.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION

Any term or expression not expressly defined herein shall have its commonly accepted definition understood by a person skilled in the art.

Figure 1A:
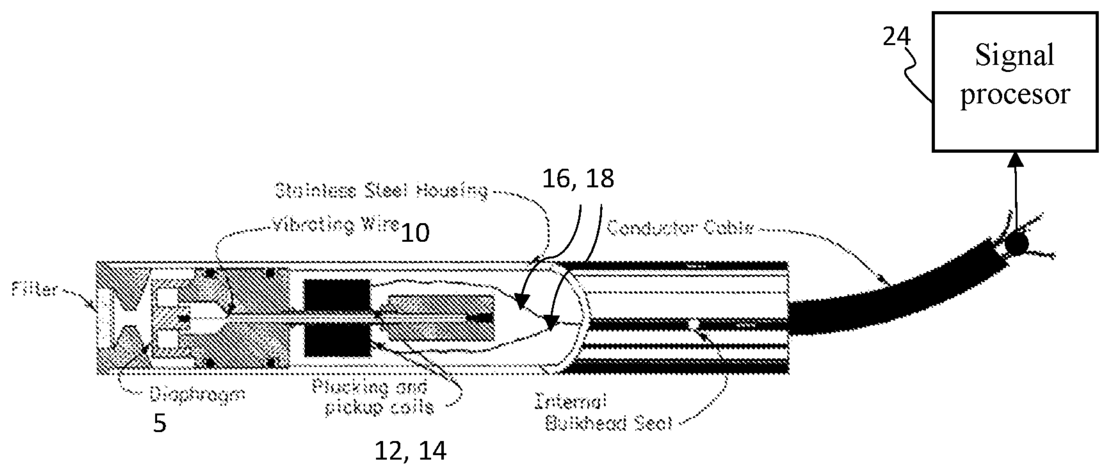
FIG. 1A shows a prior art sensor with two EMC coils wired in series and FIG. 1B shows a prior art wiring schematic.
Figure 1B:
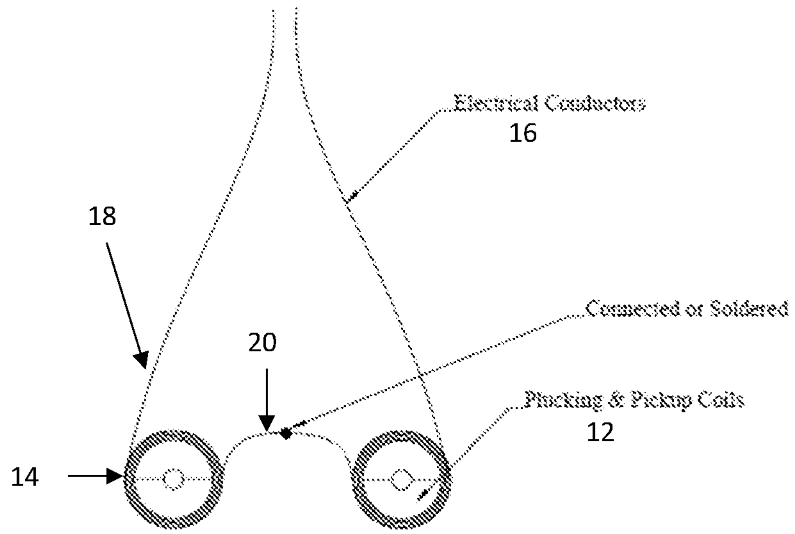

A prior art vibrating wire piezometer sensor is shown in FIG. 1A, and comprises a first electromagnetic coil (EMC) (12) and a second EMC (14), one on each side of a vibrating wire (10), which is connected to a pressure diaphragm (5). The two EMCs (12, 14) are connected to surface components, including a signal processor (24), with pair of conducting wires (16, 18). An interconnecting wire (20) attaches the two EMCs (12, 14) to each other. A wiring schematic is shown in FIG. 1B. The EMCs (12, 14) are comprised of very thin (typically 40 AWG) wire that is wrapped around a bobbin and are subject to damage and failure.

When a voltage is applied to the EMCs (12), the vibrating wire (10) is plucked. One or both of the two EMCs (14) senses the frequency with which the wire (10) vibrates and transmits an electrical signal through the electrical conductor to the surface signal processor (24) that reads the signal coming from the second EMC (14) and translates it to a pressure measurement.

The present invention uses two EMCs wired in series and in parallel. The benefit of adding the extra wire and wiring the EMCs in parallel, is that if one EMC or connection fails, the other is still connected and a pressure sensor reading may still be obtained.

Figure 2:
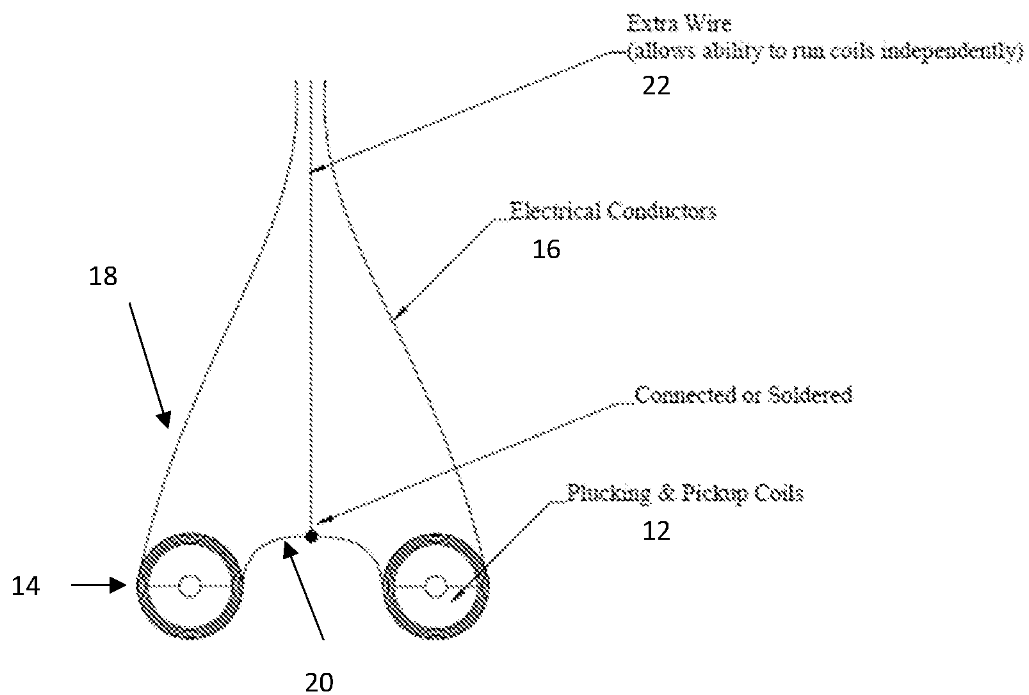
FIG. 2 shows a wiring schematic of one embodiment of the present invention.

In one aspect, the present invention comprises a vibrating wire piezometer pressure sensor system, which is otherwise a conventional system as shown in FIG. 1A, with a wiring modification as shown in FIG. 2. Therefore, the system may comprise:

(a) a vibrating wire (10) connected to a pressure diaphragm (5);

(b) a first EMC (12) associated with the vibrating wire;

(c) a second EMC (14) associated with the vibrating wire;

(d) wherein a first electrical conductor (16) is attached to the first EMC, a second electrical conductor (20) attaches the first EMC to the second EMC, a third electrical conductor (18) is attached to the second EMC, and a fourth electrical conductor (22) is attached to the second electrical conductor;

(e) wherein the first, third and fourth electrical conductors are connected to a signal processor (24) for converting an electrical signal to a pressure measurement.

The signal processor (24) is a conventional system which reads the signal coming from the pickup EMC and translates it to a pressure measurement. In use, the signal processor (24) may be disposed at or above the ground surface, while the other components of the system may be disposed beneath the ground surface, in order to measure pressure below the ground surface.

The fourth conductor (22) is an extra wire, which effectively wires the two EMCs (12, 14) in parallel. The benefit of adding the extra wire is if one conductor (16 or 18) fails, or if one EMC fails, the system can be switched to the fourth conductor (22). Therefore, instead of the entire system failing, a valid pressure reading can still be obtained by switching to a parallel wiring configuration and relying on a single EMC. "Parallel wiring configuration", as used herein, refers to a wiring circuit that connects the signal processor (24) in series to the two EMCs (12, 14), with the two EMCs (12, 14) being connected in parallel to each other.

A stronger signal is obtained by the series wiring configuration because both EMCs are sending a signal to the signal processor (24). Therefore, it is preferable to use the series wiring configuration and switch to the parallel wiring configuration only if a failure of the series wiring configuration, or other problem occurs. "Series wiring configuration", as used herein, refers to a wiring circuit that connects the signal processor (24) in series to the two EMCs (12, 14), with the EMCs (12, 14) being connected in series to each other.

It will be understood that the system may further comprise an electrical switch device (not shown) for switching between the series wiring configuration and either one or both of the two parallel wiring configurations.

Exemplary Aspects

In view of the described devices, systems, and methods and variations thereof, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A vibrating wire piezometer pressure sensor system, comprising:

(a) a vibrating wire connected to a pressure diaphragm;

(b) a first EMC associated with the vibrating wire;

(c) a second EMC associated with the vibrating wire;

(d) wherein a first electrical conductor is attached to the first EMC, a second electrical conductor attaches the first EMC to the second EMC, a third electrical conductor is attached to the second EMC, and a fourth electrical conductor is attached to the second electrical conductor; and (e) a signal processor for converting an electrical signal to a pressure measurement, wherein the signal processor is operably connected to the first, third and fourth electrical conductors.

Aspect 2: The system of Aspect 1, comprising any feature or element described or illustrated herein.

Aspect 3: A vibrating wire piezometer pressure sensor system, comprising:

(a) a vibrating wire connected to a pressure diaphragm;

(b) a first EMC associated with the vibrating wire;

(c) a second EMC associated with the vibrating wire;

(d) wherein the first EMC and the second EMC are wired in series and in parallel to a signal processor for converting an electrical signal to a pressure measurement.

Aspect 4: The system of Aspect 3, comprising any feature or element described or illustrated herein.

Aspect 5: A method of operating a vibrating wire piezometer pressure sensor system of any one of Aspects 1 to 6, comprising the steps of:

(a) operating the system using a series wiring configuration; and (b) switching to and operating the system using a parallel wiring configuration and using the signal processor to receive an electrical signal from only one of the two EMCs.

Aspect 6: A method of operating a vibrating wire piezometer pressure sensor system comprising first and second EMCs, wired in series and in parallel to a signal processor for converting an electrical signal to a pressure measurement, the method comprising the step of switching from a series wiring configuration to a parallel wiring configuration and using the signal processor to receive an electrical signal from only one of the two EMCs.

Aspect 7: The system of any one of Aspects 1 to 4 or the method of any one of Aspects 5 to 6, wherein the vibrating wire, the first EMC, and the second EMC are disposed beneath a ground surface, and wherein the signal processor is disposed at or above the ground surface.

Aspect 8: An assembly for a vibrating wire piezometer pressure sensor system comprising a signal processor for converting an electrical signal to a pressure measurement, the assembly comprising:

(a) a vibrating wire connected to a pressure diaphragm;

(b) a first EMC associated with the vibrating wire;

(c) a second EMC associated with the vibrating wire;

(d) a first wiring circuit for connecting the signal processor in series to the first EMC and the second EMC, with the first EMC and the second EMC being connected in series to each other; and (e) a second wiring circuit for connecting the signal processor in series to the first EMC and the second EMC, with the first EMC and the second EMC being connected in parallel to each other.

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A vibrating wire piezometer pressure sensor system, comprising:

(a) a vibrating wire connected to a pressure diaphragm;

(b) a first EMC associated with the vibrating wire;

(c) a second EMC associated with the vibrating wire;

(d) wherein a first electrical conductor is attached to the first EMC, a second electrical conductor attaches the first EMC to the second EMC, a third electrical conductor is attached to the second EMC, and a fourth electrical conductor is attached to the second electrical conductor; and (e) a signal processor for converting an electrical signal to a pressure measurement, wherein the signal processor is operably connected to the first, third and fourth electrical conductors.

2. A vibrating wire piezometer pressure sensor system, comprising:

(a) a vibrating wire connected to a pressure diaphragm;

(b) a first EMC associated with the vibrating wire; and (c) a second EMC associated with the vibrating wire;

(d) wherein the first EMC and the second EMC are wired in series and in parallel to a signal processor for converting an electrical signal to a pressure measurement.

3. A method of operating a vibrating wire piezometer pressure sensor system comprising first and second EMCs, wired in series and in parallel to a signal processor for converting an electrical signal to a pressure measurement, the method comprising the step of switching from a series wiring configuration, to a parallel wiring configuration and using the signal processor to receive an electrical signal from only one of the two EMCs.

4. The method of claim 3 wherein the switch to the parallel wiring configuration occurs when the series wiring configuration fails or one EMC fails.

* * * * *